July 14, 1970     J. HRDINA     3,520,517
THROUGH-FLOW MEASURING CELL FOR PHOTOMETERS
Filed Oct. 5, 1965     7 Sheets-Sheet 1

JIŘÍ HRDINA INVENTOR.

BY Paul H. Smolka

His Attorney

July 14, 1970  J. HRDINA  3,520,517
THROUGH-FLOW MEASURING CELL FOR PHOTOMETERS
Filed Oct. 5, 1965  7 Sheets-Sheet 5

JIŘÍ HRDINA INVENTOR.

BY Paul H. Smolka

His Attorney

July 14, 1970  J. HRDINA  3,520,517
THROUGH-FLOW MEASURING CELL FOR PHOTOMETERS
Filed Oct. 5, 1965  7 Sheets-Sheet 6

JIŘÍ HRDINA INVENTOR.

BY Paul H. Smolka
His Attorney

JIŘÍ HRDINA INVENTOR.

BY Paul H. Smolka
His Attorney

United States Patent Office 3,520,517
Patented July 14, 1970

3,520,517
THROUGH-FLOW MEASURING CELL FOR PHOTOMETERS
Jiří Hrdina, Prague, Czechoslovakia, assignor to Ceskoslovenska akademie ved. Prague, Czechoslovakia, a corporation of Czechoslovakia
Filed Oct. 5, 1965, Ser. No. 493,037
Claims priority, application Czechoslovakia, Oct. 8, 1964, 5,572/64
Int. Cl. G01n 1/10
U.S. Cl. 356—246                6 Claims

ABSTRACT OF THE DISCLOSURE

A flow through cell for measuring extinction of fluids in chromatographic processes. The cell and its inlet and outlet passages are shaped to cause turbulence in the fluid passing through the cell. The turbulence introduced in the cell overcomes the effect of frictional drag along the walls of the passage. Specifically, the cell is substantially cylindrical and the inlet and outlet passages are offset from the central axis of the cell in order to produce a helical flow pattern through the cell.

In photometers with through-flow measuring cells for photometric measurements in several regions there exists a very troublesome effect which follows from the laws of flow, namely that the flow rate is not constant along the flow cross section, but is greatest in the centre and zero in the direct proximity of the walls. This troublesome effect manifests itself in a very marked way especially when the photometer is to indicate a sequence of sharp closely consecutive concentration changes, as for example in modern chromatographic processes in increasing their effectiveness.

In practice the above troublesome effect mainfests itself therein that the coloured zone does not evenly pervade the whole cross section, but spreads essentially through the centre as a fibre gradually increasing in width and gradually occupying more and more space in the measuring cell around its axis. If the zone is sufficiently sharp, a new uncolored buffer penetrates in a similar way again in the form of a narrow column spreading through the centre and gradually increasing in width, so that the coloured zone then in fact forms a sort of a parabolic hollow layer like a very elongated peak of an egg shell. This very troublesome effect influences in a very undesirable manner the sharpness of the partition accomplished by a column. This partition is as a rule strongly devaluated also by the passage through a capillary reactor, which equally undesirable blurring of the sharpness of zones coalesces by insomuch a similar effect, as has just been described with the process in the measuring cell, that the two troublesome phenomena usually are not distinguished from each other and are often neglected, though at the very cost of the total result of the chromatographic analysis being by far devaluated as compared with the case of partition when eluate could be evaluated without the above losses as it comes after partition from the chromatographic column.

The described troublesome effect of flow through a measuring cell naturally manifests itself especially in long measuring cells of a fairly constant cross section. But even in the case when a measuring cell designed for photometry in three superimposed photometric channels is realized in such way that it has full photometric effective cross section only in the short points of the actual photometric measurement, whereas otherwise, it has a capillary shape, a certain diminishing of the above effect is accomplished, but by far not its suppression, since the laws of laminar flow with a parabolic distribution of flow rates are essentially valid even in the portions conically increasing and decreasing in width, through perhaps with certain deviations from the flow through a cylindrical tubing.

It is therefore necessary to arrange the photometric measuring cell in a suitable manner so as to suppress the above effects. This may be realized by introducing the whirling up of the content of the measuring cell, this content being reduced to the smallest space required for measuring the photometric extinction in this space.

This aim may be reached and the above given substantial defects of current photometric measuring cells can be obviated essentially in two ways:

Either the kinetic energy of the liquid entering the measuring cell is utilized by arranging a reduced cross section of the inflow into the space of the measuring cell to achieve a sufficiently great outlet velocity, the placing of the inlet and possibly also outlet being designed so as to make the liquid in the measuring cell, which is limited to the most necessary extinction space, move by a helical motion, whereby both the above motion and the rate of the inflowing liquid secures a sufficient turbulence and thus also a rapid mixing of the liquid and especially the suppression of the above given centrally advancing paraboloidal fibre gradually increasing in width.

A second possible way, by which the homogenization of the content of the photometric measuring cell in the range of its extinction space can be accomplished, consists therein that a mechanically driven piston is used to provide the mixing of the liquid in the given space, and possibly the content of the measuring cell is pressed out by a piston in the form of a plunger which in the bottom dead center almost entirely fills the volume of the measuring cell, so that the measuring cell is newly filled essentially only by the liquid flowing in from the bottom, which liquid is then mixed with an arbitrarily small amount of the liquid remaining which was in the measuring cell in the previous measuring cycle. This second way—mechanically more challenging—requires that the photometric measurements be carried out after certain intervals, which is a common procedure in all cases when the recording of the results is realized by means of a "point recorder," i.e. a recording device that prints after certain intervals marks of the same kind which form more or less continuous curves of which a larger number can be recorded simultaneously.

The basic principle of the invention consists therein that the inlet into the extinction space of the measuring cell is executed tangentially by means of a bore a reduced cross section and the outlet is placed so as to secure a helical motion of the liquid at a sufficient rate and thus its turbulence, or a movable piston is arranged in the measuring cell for the required homogenization of the content of the cell.

Figure 1:
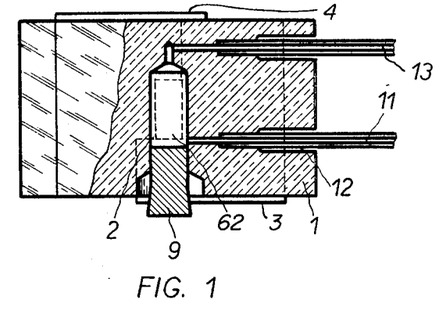
FIG. 1 is a plan view, partially in cross section, of a measuring cell in accordance with this invention.

This invention is illustrated in the accompanying drawings in which:

FIG. 4b is a cross-sectional view of the measuring cell along the line 4b—4b in FIG. 4a;

FIG. 5b is a cross-sectional view of the measuring cell along the line 5b—5b in FIG. 5a;

FIG. 6b is a longitudinal cross-sectional view of the measuring cell of FIG. 6a;

FIG. 8b is a perspective exploded view of the closure for the measuring cell in FIG. 8a;

FIG. 9 is a longitudinal cross-sectional view of a modification of the closure in FIG. 8a;

FIG. 10 is a longitudinal cross-sectional view of a second modified closure for the measuring cell of FIG. 8a;

FIG. 1 is a section of a measuring cell made of a transparent material, such as Plexiglas. The material is in the form of a plate of the shown shape, through which across, i.e. perpendicularly to the plane of the drawing, runs the axis of the bundle of rays.

Figure 2:
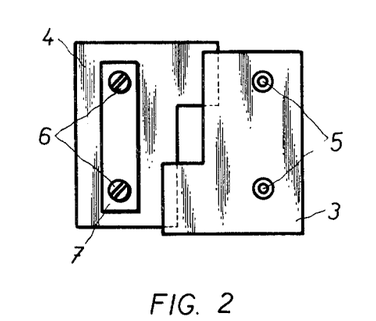
FIG. 2 is a plan view of screens defining the optical path through the measuring cell of FIG. 1.

The transparent plate 1 is provided near its centre with a bore 2 of the shown shape, with optically smooth walls which form the walls of the extinction space, through which perpendicularly passes the bundle of rays through a window 62 shown dashed in FIG. 1. This window is framed by screens 3 and 4 shown in FIG. 2 and in FIG. 3 which is an enlarged cross section of the extinction space of the measuring cell. In order that the two screens might be precisely adjusted toward the extinction space, they are provided with holes larger than are the adjusting screws 5 and 6 which the screens 3 and 4 can be brought to the measuring cell over washers 7 and 8. The bore 2, which is only a little larger than is necessary for the passage of the ray bundle through its central part, is closed by a stopper 9 from the bottom. The whirling in this space is secured by a tangential inlet 10 which is formed by a thin bore. Liquid is fed to the inlet 10 through a needle 11 having an extension which is received in a bore 12. The bore 12 has a counterbore which guides the needle and forms a seat for securing the needle in position.

The discharge of the liquid in the uppermost portion of the bore of the shown shape is realized in an analogous way by means of a needle 13. The needle 13 may be connected to the uppermost narrowed portion of the space of the measuring cell which arrangement secures the outflow of bubbles which either intentionally or unintentionally were introduced into the measuring cell, as shown in FIG. 3 or the needle 13 may discharge in the upper portion of the full bore of the measuring cell (whose upper narrowed portion is then omitted) as shown in FIG. 3.

Figure 3:
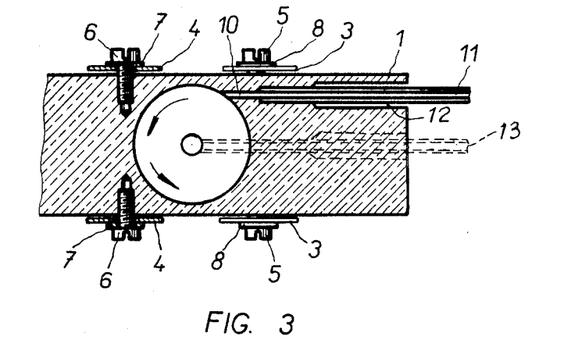
FIG. 3 is a cross-sectional view of the measuring cell of FIG. 1.

The needle 13 may reach as far as to the extinction space and due to its tangential placement, the needle 13 as well as the tangential outlet contributes to the general helical motion shown by the arrows in FIG. 3. Also, the inlet needle 11 may have an extension which reaches as far as the bore 2 of the measuring cell the whirling in the measuring cell, as well as by the tangential outlet which also contributes to the general helical motion shown in the plan in FIG. 3 by the respective arrows. Also the inlet needle 11 can possibly be realized with an overreach as far as the space of the measuring well.

Figure 4A:
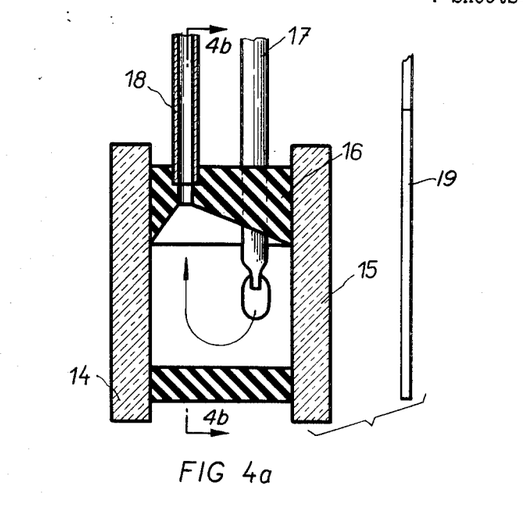
FIG. 4a is a longitudinal cross-sectional view of a second embodiment of the measuring cell of this invention.

Further examples of the numerous possibilities of design versions of measuring cells with whirling accomplished by the inflow of liquid are shown in the further figures. The walls of the photometric measuring cell proper can be made of glass or possibly even of quartz glass, as for example in the use of measuring cells for photometry in the ultraviolet. Thus for instance FIG. 4a shows in a longitudinal section (i.e. in the direction of the passage of the ray bundle) and FIG. 4b in a cross section a measuring cell with parallel transparent walls 14 and 15 clamped or kept at a distance by nonillustrated conventional mechanical means, so that between them is elastically clamped a packing and limiting insert 16, for example of silicon rubber, of the shown shape. The arrows in the two figures indicate the main direction of the helical motion of the liquid which is introduced into the extinction space by an inflow needle 17 whose outflow mouth may possibly be narrowed to accomplish a greater discharge velocity. The outlet of the liquid is realized by an outlet needle 18 which is connected to the space of the measuring cell in the way evident from the figures. This assures that the bubbles that would get into the measuring cell will not accumulate in it but will be removed through the needle 18 from the uppermost point of the side space of the measuring cell. The extinction space of the measuring cell may possibly be arbitrarily limited, for example by a screen 19, this limiting of the extinction space not affecting the hydraulic conditions in the measuring cell.

Figure 4B:
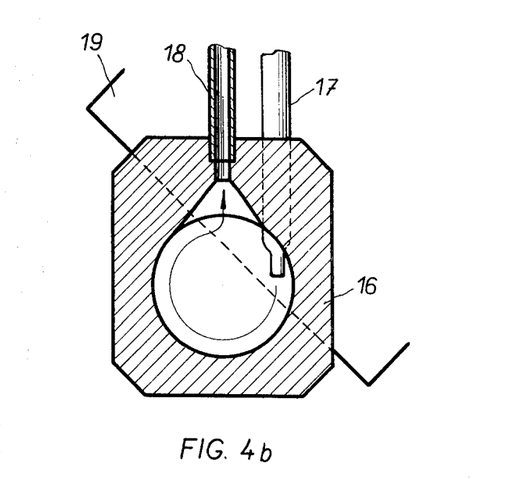

In the versions of the measuring cell according to FIGS. 4a, 4b, the distance between the two transparent front plates can naturally be arbitrarily altered. At a greater distance of these front plates as compared with the diameter of the inner hydraulic space, this type of measuring cell passes to a tubular measuring cell in which the path of the rays that pass through the measuring cell is approximately in the direction of the axis of the cylindrical hydraulic space, by which arrangement it is possible to accomplish a considerable increase in the photometric sensitivity in view of the large extinction path of the rays at a small volume of the measuring cell, this being the requirement especially in some microanalytical methods. The principle of whirling in the measuring cell is kept even here, contrary to known types of measuring cells in which the rays pass in the direction of the axis of the cylindrical space of the measuring cell, whirling not being secured, though.

Figure 5A:
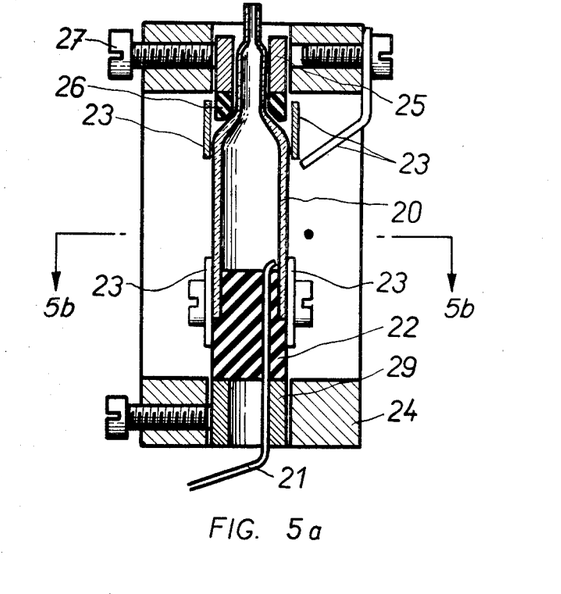
FIG. 5a is a longitudinal cross-sectional view of a third embodiment of the measuring cell of this invention.
Figure 5B:
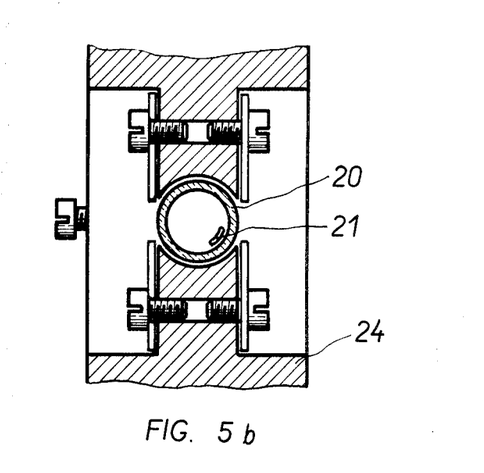

FIG. 5a shows in a longitudinal section and FIG. 5b in a cross section an example of a design version of the measuring cell, formed for example by a glass tube 20, which in its upper portion is drawn into a capillary to which is linked a further flexible capillary tubing for the outlet of the liquid. The tangential inflow at an increased rate in the lower portion of the measuring cell is realized for example by a metal capillary 21 (injection needle) bent or shaped in the way evident from the figures, this needle passing through a stopper 22 which closes the measuring cell from the bottom directly below the extinction space limited by screens 23.

Figure 6A:
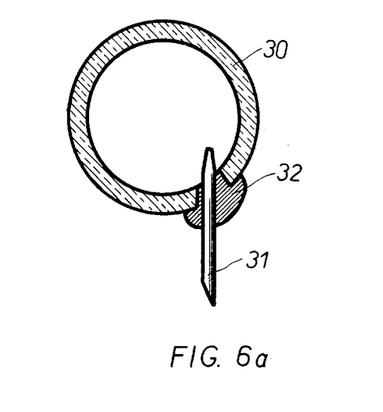
FIG. 6a is a cross-sectional view along the line 6a—6a in FIG. 6b showing a fourth embodiment of the measuring cell of this invention.
Figure 6B:
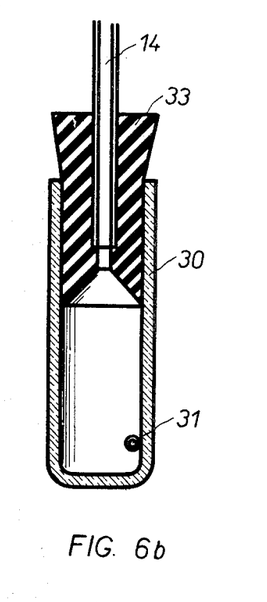
Figure 6C:
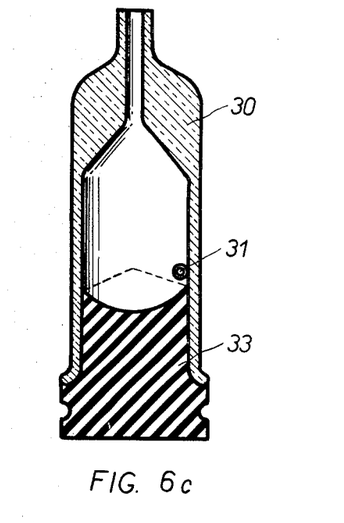
FIG. 6c is a longitudinal cross-sectional view of a modification of the fourth embodiment.

The fixing of the screens on the basic body 24 is evident from the further figures and its principle has already been described. The screens may possibly fit close to the measuring cell 20 and may even form its mechanical guidance, so long as this is not provided by other means. Such fixing means are evident in FIG. 5a where they are shown in the form of an upper adjusting ring 25, underlaid with a filler 26 made of an elastic material, on which ring rests the narrowed upper portion of the measuring cell. The metal ring 25 is fixed in the body 24 by means of a screw 27. In a similar way, i.e. by means of a screw 28 and a ring which fits close to the stopper 22, the measuring cell is fixed also in the lower portion of the body 24. FIG. 6a shows in a cross section for instance a glass measuring cell 30 which is entered by the inflow needle 31 in a tangential direction through a hole into which the needle is fixed for example by cementing with a piece of cement 32. FIGS. 6b and 6c are longitudinal sections of the same measuring cell, the figures showing two versions differing only in the placing of the closing stopper 33, as it is evident from the two figures without further explanation.

Figure 7:
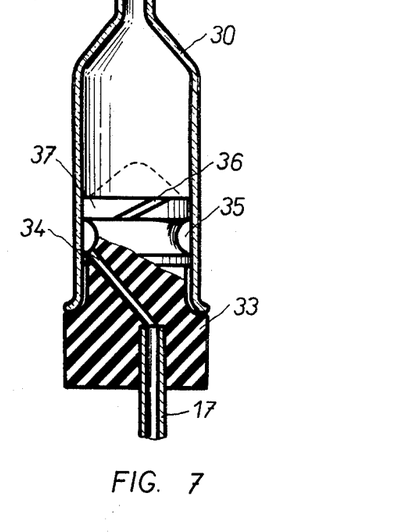
FIG. 7 is a longitudinal cross-sectional view of a fifth embodiment of a measuring cell in accordance with this invention.

FIG. 7 shows a design which uses the same photometric vessel 30 as a measuring cell, which is also in the direction from the bottom closed by a stopper of a sufficiently elastic or at least semi-solid material (e.g. silicon rubber, teflon), but differs in principle therein that instead of introducing the liquid to be measured through a needle through the wall of the measuring cell 30, the liquid is introduced through an inlet needle 17 inserted into a stopper 33, an oblique channel 34 being arranged in the stopper, which channel connects the end of the needle 17 to a small annular space 35 at the circumference of the stopper which is shaped as evident from FIG. 7. The route by which the liquid can enter also the space of the measuring cell in realized by a oblique cut narrow circumferential recess 36. This oblique recess may be a single one or there may be more of them on the circumference of the uppermost packing face 37 of a shaped stopper 33.

Figure 8A:
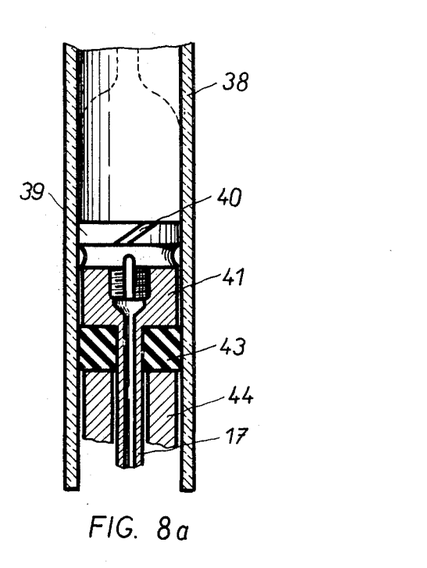
FIG. 8a is a longitudinal cross-sectional view of a sixth embodiment of the measuring cell of this invention.
Figure 8B:
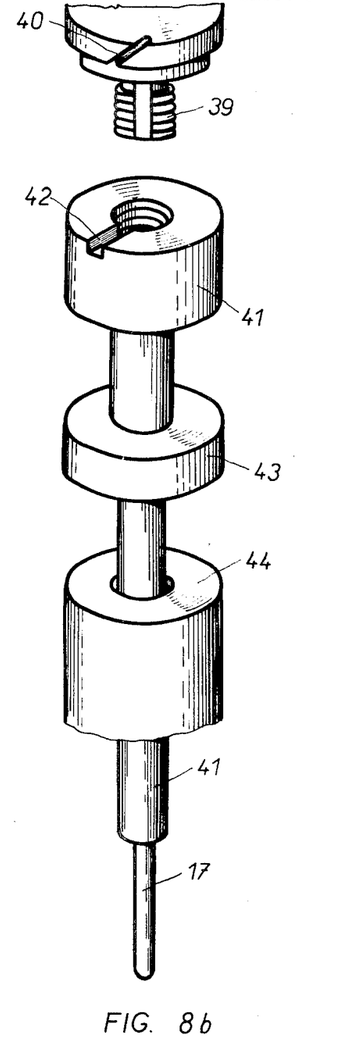

The same principle of circumferential tangential introducing of liquid into the extinction space of the measuring cell is in another version shown in FIG. 8a in a section and in FIG. 8b in a resolved state in an oblique view. The measuring cell 38, either formed by a straight tube or having a narrowing as in the previous cases (as shown in FIG. 8a dashed line), has its extinction space closed by a metal screw 39 which by its upper plane or shaped portion practically completely closes the inner cross section of the measuring cell and the liquid flows in again through an oblique circumferential recess 40.

The screw 39 has in its thread part also a groove which makes possible the connection of the circumferential with the end of the inlet needle 17, which is tightly fixed in a metal body 41 of a shown shape with a thread into which is screwed a screw 39. The groove also serves for bringing the liquid into a minute circumferential space from which leads an oblique recess 40. A perfect sealing of the entire closure of this type is realized by a collar 43 for instance of silicon rubber, which is from the bottom pressed by a tube 44, by which its transformation and a perfect sealing of the whole closure are accomplished. The pressure of the tube 44 against the body 41 is accomplished for instance by screwing a nut, not shown in the figures, which is screwed on a thread on the lower portion of the body 41, off the photometric tube 38. By screwing the above nut it is possible to accomplish the suitable adjustment of axial compression and thus also the required deformation of the elastic packing collar 43. It is evident that the entire closure can arbitrarily be shifted inside the photometric tube 38 and thus the adjustment of the whole system can be facilitated in the sence that the hydraulic space in the measuring cell 38 is bounded in the direction from below by a screw head 39, the hydraulic space being perfectly utilized for the formation of a suitable extinction space in which an especially thorough mixing of the liquid by whirling takes place.

Figure 9:
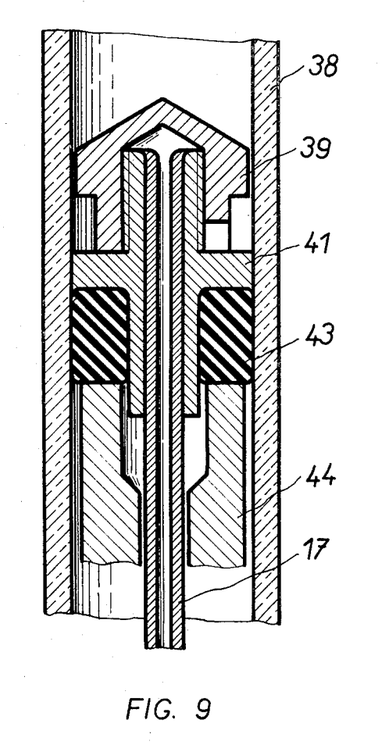
Figure 10:
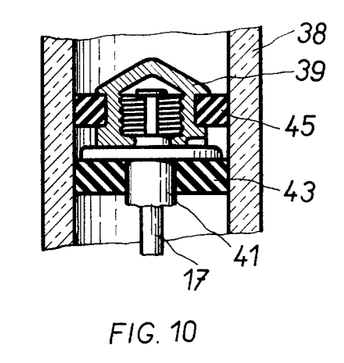
Figure 10A:
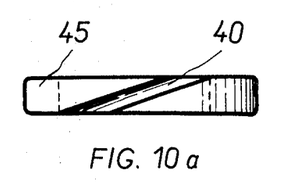
FIG. 10a is an elevational view of the elastic ring of the closure in FIG. 10.

FIGS. 9, 10 and 10a show design variants functionally identical with the just described ones. Parts of same function are marked by the same items as before. The difference consists essentially therein that here the function of the screw and the nut in items 41 and 39 is interchanged. In the variant according to FIG. 10 there is another difference therein that on the uppermost part, screwed on in the form of a nut, is mounted an elastic ring 45, e.g. of silicon rubber, whose detailed design with a groove 40 is evident from the detail in FIG. 10a.

Figures 11, 12:
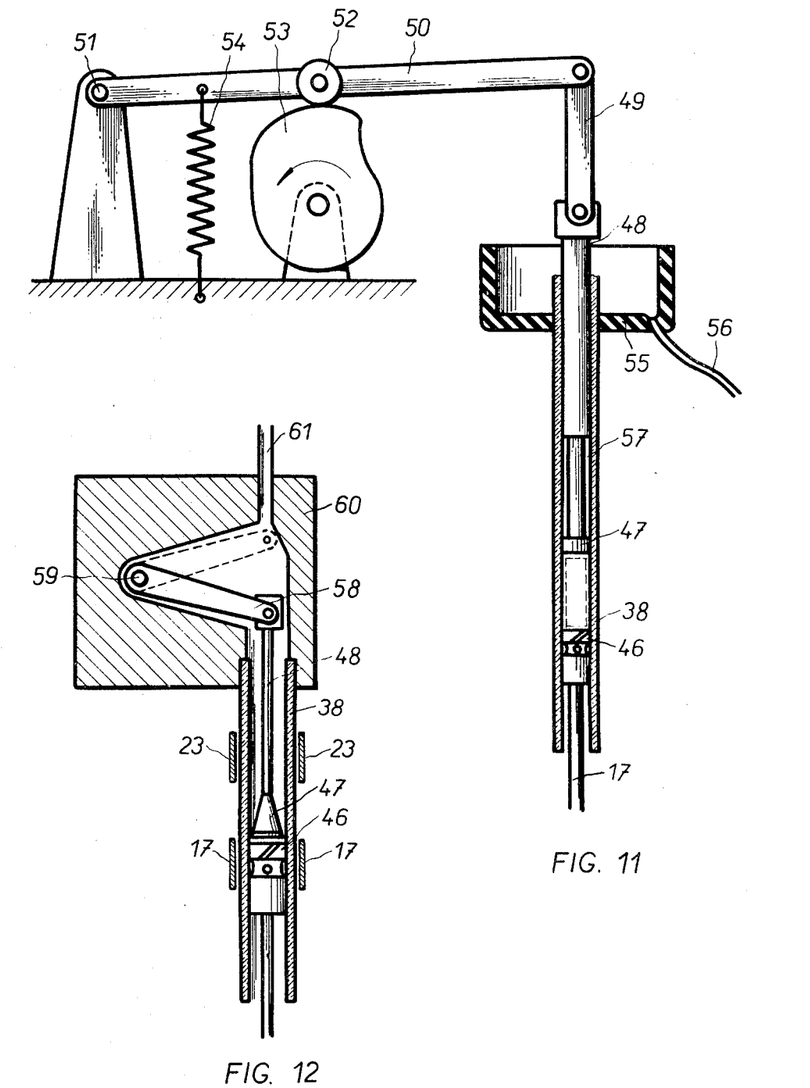
FIG. 11 is an elevational view, partially in cross section, of a seventh embodiment of the measuring cell of this invention.
FIG. 12 is an eighth embodiment of the measuring cell of this invention with a closure permitting the interior of the cell to be pressurized.

A second fundamental alternative of carrying out the homogenization of the content of the measuring cell in its extinction space by means of a piston is shown in two examples of possible basic design variants in FIGS. 11 and 12. In both cases the tubular measuring cell 38 is closed at the bottom boundary of the extinction space by a closure, e.g. according to some of the variants described with FIGS. 8 to 10, these closures being simply marked in the two figures under item 46. Naturally, even other ways of closing this space are possible, including those described with the preceding figures. In both cases a piston, whose lowermost portion is in both figures marked as item 47, can move through the entire extinction space. The upper portion of the piston 48 is in the design according to FIG. 11 linked to a connecting rod which is further linked to an arm 50 turnable around a fixed joint 51. The arm 50 carries a roller 52 engaging a cam 53 which causes the lifting of the arm 50 and also of the piston 48 on the one hand against the effect of gravity, on the other hand against the possible action of a coil 54. In FIG. 11, the piston is drawn in the upper position when, after mixing of the content of the extinction space, the photometric measurement is taken in the screened space shown dotted in FIG. 11.

After the extinction has been established photometrically, the piston 48 sinks due to the turning of the cam in the direction shown by the arrow in the downward direction and presses out the liquid contained in the extinction space into a waste vessel 55 designed e.g. as a rubber of the shown shape, into which reaches the discharge tubing 56. Thereafter, as the piston 48 slowly rises again, the space below the bottom portion 47 of the piston again fills with the liquid flow into this space possibly with turbulence, as has been described before. By selecting the shape of the cam 53 it is also possible to accomplish that the filling of the space of the measuring cell through an inlet capillary 17 takes place at a greater rate than what correspond to the vacating of space due to rising of the piston 48, the liquid penetrating into the space remaining between the piston 48 and the measuring cell 38. This space can possibly be artificially enlarged above the lowermost portion of the piston 47, so that a hollow cylindrical space 57 is formed.

The raising of the piston can be carried out only just before the photometric measurement by which it is accomplished that the liquids flows into the extinction space expecially from the space 57 close round the lower part of the piston which may possibly be also provided with oblique recesses, as described before, by which a thorough mixing of the content is accomplished just before taking a photometric measurement. The device according to FIG. 11 with an overflow vessel 55 can be used in the cases when it is unnecessary for whatever reasons to see to it that there is an overpressure in the measuring cell or in the tubing before it (especially in the capillary reactor).

However, if for whatever reason it is necessary that certain overpressure be maintained in the measuring cell or in the portions before it, it is necessary to use a device whose space, into which opens the measuring cell 38 is closed in such way as to permit the required overpressure to be maintained here. An example of a possible design is shown schematically in FIG. 12. In it, through the extinction space screened by screens 23, runs again a piston 48, but with the difference that this piston is directly linked to a turnable arm 58 firmly connected to a vibrating axis 59 which passes through a non-illustrated packing and in its external part is driven mechanically in principle in a similar way as in FIG. 11.

The measuring cell 38 is tightly connected to a body 60 provided with a recess for the motion of the arm 58, a discharge tubing 61 opening from the uppermost portion of the body. The body 60 is tightly closed from the front by a cover packed e.g. with a rubber insert. Thus the entire space above the measuring cell is so packed that it is possible to maintain in it as well as in the tubing 61 an overpressure required e.g. for a suitable formation of bubble pistons in reactors based on this principle. The required overpressure is realized either by a sufficiently high placed overflow or by any kind a suitable manostat.

Similarly as in the device according to FIG. 12, it is possible even for certain overpressures to use any one of the variants given in FIGS. 1 to 10.

I claim:
1. A flow-through measuring cell for photometers comprising in combination:
   a body having an elongated cylindrical cavity therein for receiving fluids, said cavity having a longitudinal axis,
   said body including a pair of opposed transparent wall portions spaced apart from each other, said cylindrical cavity being between and at least partially defined by said transparent wall portions, said body including an inlet passage adjacent one end of said cavity and an outlet passage communicating with said cavity, said outlet passage being spaced from said inlet passage, said inlet passage intersecting said cavity in substantially tangential relation to the cylindrical wall of said cavity; and
   means for framing the path of light rays from an external source through said transparent wall portions and through said cavity, said framing means having a light transmitting opening therein perpendicular to said path of light rays, said opening having a maximum width that is less than the diameter of said cylindrical cavity, whereby fluid discharging from said inlet passage flows in a helical path through said cavity and said framing means screens the effects of fluid conditions adjacent said inlet and outlet passages.

2. The measuring cell according to claim 1 wherein said inlet passage includes a tube projecting into said cavity said tube having a discharge nozzle at the end thereof for directing a stream of liquid against the cylindrical wall of said cavity for inducing helical flow of fluid through said cavity.

3. The measuring cell according to claim 1 wherein said body is in the shape of a transparent tube with said cavity being at least partially defined by the interior of said tube, said opposed transparent wall portions being diametrically spaced portions of the wall of said tube, said framing means being positioned for transmitting said light rays substantially perpendicular to the longitudinal axis of said cavity.

4. The measuring cell according to claim 1 wherein said inlet passage includes a disc having rim extending around the cylindrical wall of said cavity, said disc including an oblique circumferential recess for conducting fluid from one side of said disc into said cavity for inducing a helical flow path for fluid in said cavity.

5. The measuring cell according to claim 3 wherein said body includes a pair of plug means in said transparent tube, said pair of plug means being spaced apart from each other axially of said cavity, one of said plug means including an inlet passage positioned for directing a stream of fluid against the interior of the wall of the body, and the other of said plug means is movable axially in said tubular body, whereby displacement of said other plug means away from said first plug means causes fluid to flow through said recess into said cavity and displacement of said other plug means towards said first plug means expels fluid from said cavity.

6. The measuring cell according to claim 1 wherein said opposed transparent wall portions are at opposite ends of said cavity and extend perpendicular to said longitudinal axis, said light transmitting opening being circular and having a diameter less than the diameter of said cylindrical cavity.

References Cited

UNITED STATES PATENTS

| 2,690,695 | 10/1954 | Coates. |
| 2,819,402 | 1/1958 | Watson et al. |
| 3,031,924 | 5/1962 | Lamal. |
| 3,142,719 | 7/1964 | Farr. |
| 3,177,706 | 4/1965 | Shuman et al. |
| 3,289,527 | 12/1966 | Gilford et al. |
| 3,307,447 | 3/1967 | Carleton et al. |
| 3,332,316 | 7/1967 | Saunders. |
| 3,333,107 | 7/1967 | Hubbard et al. |
| 3,361,026 | 1/1968 | Ishimaru. |

RONALD L. WIBERT, Primary Examiner

W. A. SKLAR, Assistant Examiner

U.S. Cl. X.R.
250—218